United States Patent
Fujita

(10) Patent No.: US 10,795,065 B2
(45) Date of Patent: Oct. 6, 2020

(54) SOLAR-RADIATION-SHIELDING MATERIAL FOR VEHICLE WINDOW AND WINDOW FOR VEHICLE

(71) Applicant: SUMITOMO METAL MINING CO., LTD., Tokyo (JP)

(72) Inventor: Kenichi Fujita, Ichikawa (JP)

(73) Assignee: Sumitomo Metal Mining Co., Ltd. (JP)

(*) Notice: Subject to any disclaimer, the term of this patent is extended or adjusted under 35 U.S.C. 154(b) by 77 days.

(21) Appl. No.: 15/413,567

(22) Filed: Jan. 24, 2017

(65) Prior Publication Data

US 2017/0131446 A1 May 11, 2017

Related U.S. Application Data

(62) Division of application No. 12/739,436, filed as application No. PCT/JP2007/070669 on Oct. 23, 2007, now abandoned.

(51) Int. Cl.
| | |
|---|---|
| *G02B 5/20* | (2006.01) |
| *B60J 1/00* | (2006.01) |
| *G02B 5/22* | (2006.01) |
| *B32B 17/10* | (2006.01) |

(52) U.S. Cl.
CPC ........ *G02B 5/208* (2013.01); *B32B 17/10018* (2013.01); *B32B 17/10036* (2013.01); *B32B 17/10761* (2013.01); *B60J 1/00* (2013.01); *G02B 5/22* (2013.01); *B32B 2367/00* (2013.01); *B32B 2605/006* (2013.01)

(58) Field of Classification Search
CPC ............... B60J 1/00; B32B 17/10036; B32B 17/10761; B32B 17/10018; B32B 2605/006; B32B 2367/00; G02B 5/208; G02B 5/22
See application file for complete search history.

(56) References Cited

U.S. PATENT DOCUMENTS

| | | | |
|---|---|---|---|
| 5,712,332 A | 1/1998 | Kaieda et al. | |
| 5,830,568 A | 11/1998 | Kondo | |
| 5,925,453 A | 7/1999 | Kase et al. | |
| 5,956,175 A | 9/1999 | Hojnowski | |
| 6,171,747 B1 * | 1/2001 | Sugizaki | G03G 9/0823 430/110.4 |
| 6,284,383 B1 | 9/2001 | Nishiyama | |
| 7,238,418 B2 | 7/2007 | Fujita | |
| 2002/0182422 A1 | 12/2002 | Garrett et al. | |
| 2003/0122114 A1 * | 7/2003 | Dobler | C08K 9/06 252/587 |
| 2006/0008640 A1 * | 1/2006 | Chonan | B32B 17/10018 428/328 |
| 2006/0178254 A1 | 8/2006 | Takeda et al. | |

FOREIGN PATENT DOCUMENTS

| | | |
|---|---|---|
| JP | 61-277437 | 12/1986 |
| JP | 4-160041 | 6/1992 |
| JP | 6-256541 | 9/1994 |
| JP | 8-217500 | 8/1996 |
| JP | 8-259279 | 10/1996 |
| JP | 10-297945 | 11/1998 |
| JP | 2001-89202 | 4/2001 |
| JP | 2001-179887 | 7/2001 |
| JP | 2004-162020 | 6/2004 |
| JP | 2005-232399 | 9/2005 |
| WO | 2005/087680 | 9/2005 |

\* cited by examiner

*Primary Examiner* — Cheng Yuan Huang
(74) *Attorney, Agent, or Firm* — Gerald E. Hespos; Michael J. Porco; Matthew T. Hespos

(57) ABSTRACT

A solar-radiation-shielding material for vehicle windows reduces the visible light transmittance, and reduces the value of solar radiation transmittance/visible light transmittance. The visible light transmittance of the solar-radiation-shielding material is in the range of 5%. The transmission color of the solar-radiation-shielding material satisfies the Expression 2: $-14<a^*<2$, and $-8<b^*<2$.

2 Claims, No Drawings

US 10,795,065 B2

SOLAR-RADIATION-SHIELDING MATERIAL FOR VEHICLE WINDOW AND WINDOW FOR VEHICLE

The present application is a divisional application of U.S. patent application Ser. No. 12/739,436, filed Apr. 23, 2010, the contents of which are hereby incorporated by reference in their entirety.

BACKGROUND OF THE INVENTION

1. Field of the Invention

The present invention relates to a solar-radiation-shielding material for vehicle windows used for a sunroof, a panorama roof, a back window, a rear side window, or a front window of an automobile, an electric train, heavy equipment, and so on.

2. Description of the Related Art

Conventionally, as safety glass for, for example, an automobile, laminated glass constituted of two glass plates and a solar-radiation-shielding film disposed between the plates has been proposed for reducing air-conditioning cooling load and reducing human feeling of heat by shielding incident solar energy by the laminated glass.

For example, Japanese Patent Laid-Open No. S61-277437, Japanese Patent Laid-Open No. H10-146919 and Japanese Patent Laid-Open No. 2001-179887 propose heat-ray-shielding plates in which a heat-ray reflective film composed of a transparent resin film deposited with a metal or a metal oxide is bonded to a transparent molded product such as glass, an acrylic plate, or a polycarbonate plate.

However, the heat-ray reflective film is very expensive itself and is also high cost because complicated processes such as a bonding process are necessary. In addition, since the adhesive properties between the transparent molded product and the reflective film are not good, the heat-ray-shielding plates have a problem that detachment of the film is caused by a change with the passage of time.

Furthermore, there are proposed a large number of heat-ray-shielding plates each composed of a transparent molded product having a surface directly deposited with a metal or a metal oxide, but the production of such heat-ray-shielding plates needs an apparatus that can highly precisely control the atmosphere in high vacuum and therefore has problems of being low in mass productivity and of being low in versatility.

Furthermore, for example, Japanese Patent Laid-Open No. H6-256541 and Japanese Patent Laid Open No. H6-264050 propose heat-ray-shielding plates and films produced by kneading an organic near-infrared absorber represented by a phthalocyanine-based compound or an anthraquinone-based compound with a thermoplastic transparent resin such as polyethylene terephthalate resin, a polycarbonate resin, an acrylic resin, a polyethylene resin, or a polystyrene resin.

However, in order to sufficiently shield heat rays, a large amount of the near-infrared absorber must be blended, and the near-infrared absorber blended in a large amount causes a problem of decreasing visible light-transmitting ability. In addition, since an organic compound is used, the weather resistance is low, and, therefore, the application to, for example, window materials of buildings and automobiles, which are always exposed to direct sunlight, is not necessarily appropriate.

In addition, Japanese Patent Laid-Open No. H8-217500 discloses laminated glass constituted of a pair of glass plates and a soft resin layer interposed between the plates. The soft resin layer contains heat-ray-shielding metal oxide fine particles that are made of tin oxide or indium oxide and have a particle size of 0.1 μm or less.

Furthermore, Japanese Patent Laid-Open No. H8-259279 discloses laminated glass constituted by disposing an intermediate layer between at least two glass plates. The intermediate layer contains a metal of Sn, Ti, Si, Zn, Zr, Fe, Al, Cr, Co, Ce, In, Ni, Ag, Cu, Pt, Mn, Ta, W, V, or Mo, an oxide, nitride, or sulfide of such a metal, Sb- or F-doped compound thereof, or a composite thereof, which is dispersed therein.

Furthermore, Japanese Patent Laid-Open No. H4-160041 discloses window glass for automobiles. The window glass includes transparent plate-like members and fine particles made of $TiO_2$, $ZrO_2$, $SnO_2$, and $In_2O_3$ and a glass component composed of organic silicon or an organic silicon compound interposed between the members.

Furthermore, Japanese Patent Laid-Open No. H10-29745 discloses laminated glass having at least an intermediate layer composed of three layers between two transparent glass plates. The second layer, i.e., the middle layer, of the intermediate layer contains a metal of Sn, Ti, Si, Zn, Zr, Fe, Al, Cr, Co, In, Ni, Ag, Cu, Pt, Mn, Ta, W, V, or Mo, an oxide, nitride, or sulfide of such a metal, Sb- or F-doped compound thereof, or a composite thereof, which dispersed therein. The first layer and the third layer of the intermediate layer are resin layers.

Furthermore, the present applicant proposes in Japanese Patent Laid-Open No. 2001-89202 solar-radiation-shielding laminated glass composed of an intermediate layer having a solar-radiation-shielding function interposed between two glass plates, wherein the intermediate layer is constituted of an intermediate film containing hexaboride fine particles alone; or hexaboride fine particles, ITO fine particles and/or ATO fine particles, and a vinyl-based resin, or wherein the intermediate layer is constituted of a solar-radiation-shielding film disposed on the inner surface of at least one of the two glass plates and containing the above-mentioned fine particles, and an intermediate film interposed between the two glass plates and containing the vinyl-based resin.

In addition, Japanese Patent Laid-Open No. 2001-89202 discloses that the optical characteristics of the solar-radiation-shielding laminated glass to which the hexaboride fine particles alone or the hexaboride fine particles and the ITO fine particles and/or the ATO fine particles are applied have a maximum transmittance in a visible light region and show strong absorption in a near-infrared region to have a minimum transmittance therein, and thereby the solar-radiation-shielding laminated glass is improved in solar radiation transmittance to the order of 50%, when the visible light transmittance is 70% or more, compared to conventional laminated glass described in Japanese Patent Laid-Open No. S61-277437, Japanese Laid-Open No. H10-146919, Japanese Laid-Open No. 2001-179887 and Japanese Laid-Open No. H6-256541.

A window having such solar-radiation-shielding properties, tries to increase both brightness and solar-radiation-shielding properties as high as possible. However, in a sunroof, a panorama roof, a back window, a rear side window, and a front window of an automobile, a sunroof of heavy equipment, and so on, a design that gives priority to how economically it shields heat of solar rays, rather than the brightness is required.

In order to obtain laminated glass that can be practically applied to such a vehicle window portion, it is proposed to decrease visible light transmittance to control the color tone to cyaneous, gray, bronze (reddish brown), or dark green. However, when the above-described conditions are satisfied, the value of solar radiation transmittance/visible light transmittance, which is an index to solar-radiation-shielding properties, cannot be reduced to be lower than one, and the laminated glass is thus inferior in solar-radiation-shielding properties and thereby still remains room for improvement.

The present invention has been accomplished in light of the above-described problems, and it is an object of the invention to provide a solar-radiation-shielding material for vehicle windows and a window for a vehicle, in which the visible light transmittance has been reduced, the color tone has been controlled to cyaneous, gray, bronze (reddish brown), or dark green, which are highly required, and also the value of solar radiation transmittance/visible light transmittance, which is an index to solar-radiation-shielding properties, has been reduced to less than 1, and the manufacturing cost is low.

SUMMARY OF THE INVENTION

That is, a first aspect of the present invention is a solar-radiation-shielding material for vehicle windows that contains fine particles having a heat-ray-shielding function used in a window of a vehicle. The fine particles having the heat-ray-shielding function are a mixture including at least one type of fine particles selected from the group consisting of lanthanum hexaboride, titanium nitride, and tungsten oxide and at least one type of fine particles selected from the group consisting of antimony-doped tin oxide, tin-doped indium oxide, and a composite tungsten oxide defined by a general formula: $M_YWO_Z$ (0.001≤Y≤1.0, and 2.2≤Z≤3.0). The visible light transmittance of the solar-radiation-shielding material is in the range of 5% or more and 40% or less. The solar radiation transmittance and the visible light transmittance of the solar-radiation-shielding material satisfy the following Expression 1, and the transmission color of the solar-radiation-shielding material satisfies the following Expression 2:

solar radiation transmittance/visible light transmittance<1, and  Expression 1:

−14<$a^*$<2, and −8<$b^*$<2.  Expression 2:

A second aspect of the present invention is a solar-radiation-shielding material for vehicle windows that contains fine particles having a heat-ray-shielding function used in a window of a vehicle. The fine particles having the heat-ray-shielding function are a mixture including at least one type of fine particles selected from the group consisting of lanthanum hexaboride, titanium nitride, and tungsten oxide, at least one type of fine particles selected from the group consisting of antimony-doped tin oxide, tin-doped indium oxide, and a composite tungsten oxide defined by a general formula: $M_YWO_Z$ (0.001≤Y≤1.0, and 2.2≤Z≤3.0), and iron oxide fine particles. The visible light transmittance of the solar-radiation-shielding material is in the range of 5% or more and 40% or less. The solar radiation transmittance and the visible light transmittance of the solar-radiation-shielding material satisfy the following Expression 3, and the transmission color of the solar-radiation-shielding material satisfies the following Expression 4:

solar radiation transmittance/visible light transmittance<1, and  Expression 3:

−2<$a^*$<14, and 2<$b^*$<12.  Expression 4:

A third aspect of the present invention is a solar-radiation-shielding material for vehicle windows according to the first or second aspect of the invention, wherein the tungsten oxide is $WO_2$ or $W_{18}O_{49}$.

A fourth aspect of the present invention is a solar-radiation-shielding material for vehicle windows according to the first or second aspect of the invention, wherein the element M contained in the composite tungsten oxide fine particle is at least one selected from the group consisting of Cs, Rb, K, Tl, In, Ba, Li, Ca, Sr, Fe, and Sn.

A fifth aspect of the present invention is a solar-radiation-shielding material for vehicle windows according to the first to fourth aspects of the invention, wherein the fine particles having the heat-ray-shielding function have a diameter of 300 nm or less.

A sixth aspect of the present invention is a solar-radiation-shielding material for vehicle windows according to the first to fifth aspects of the invention, wherein the fine particles having the heat-ray-shielding function are surface-treated with at least one type of compound selected from the group consisting of a silane compound, a titanium compound, and a zirconia compound.

A seventh aspect of the present invention is a solar-radiation-shielding material for vehicle windows according to the first to sixth aspects of the invention, and the solar-radiation-shielding material further contains at least one type of fine particles selected from the group consisting of zinc oxide fine particles, cerium oxide fine particles, and titanium oxide fine particles.

An eighth aspect of the present invention is a solar-radiation-shielding material for vehicle windows according to the first to seventh aspects of the invention, wherein the fine particles having the heat-ray-shielding function are contained in a polycarbonate resin molded product.

A ninth aspect of the present invention is a solar-radiation-shielding material for vehicle windows according to the eighth aspect of the invention, wherein the polycarbonate resin molded product is provided with an abrasion-resistant hard coat layer on at least one surface.

A tenth aspect of the present invention is a solar-radiation-shielding material for vehicle windows prepared by laminating the solar-radiation-shielding material according to the eighth or ninth aspect of the invention to another resin molded product.

An eleventh aspect of the present invention is a solar-radiation-shielding material for vehicle windows according to the first to seventh aspects of the invention, wherein the fine particles having the heat-ray-shielding function are contained in one type of resin selected from the group consisting of a polyvinyl butyral resin, a polyvinyl acetate resin, and a polyvinyl alcohol resin.

A twelfth aspect of the present invention is a solar-radiation-shielding material for vehicle windows having a laminated structure including the solar-radiation-shielding material according to the eleventh aspect of the invention interposed as an intermediate film between two laminated plates, wherein the laminated plates are at least one selected from the group consisting of an inorganic glass plate, a polycarbonate resin molded product, and a polyethylene terephthalate resin molded product.

A thirteenth aspect of the present invention is a solar-radiation-shielding material for vehicle windows according to the twelfth aspect of the invention, wherein at least one of the laminated plates is the solar-radiation-shielding material according to the eighth to tenth aspects of the invention.

A fourteenth aspect of the present invention is the solar-radiation-shielding material for vehicle windows according to the first to thirteenth aspects, wherein the solar-radiation-shielding material for vehicle windows has a shape with a thickness of 2.5 to 30 mm and a maximum projected area of 400 to 60000 $cm^2$.

A fifteenth aspect of the present invention is a window for a vehicle in which a solar-radiation-shielding material for vehicle windows according to the first to fourteenth aspects of the invention is used.

Advantageous Effects of Invention

In the solar-radiation-shielding material for vehicle windows and the window for a vehicle according to the present invention, it is possible to provide a solar-radiation-shielding material for vehicle windows and a window for a vehicle that have not been conventionally obtained, in which the visible light transmittance has been reduced, the color tone has been controlled to cyaneous, gray, bronze (reddish brown), or dark green, which are highly required, the value of solar radiation transmittance/visible light transmittance, which is an index to solar-radiation shielding properties, has been reduced to less than one, and the manufacturing cost is low, and such solar-radiation-shielding material and the vehicle window can be applied to a sunroof, a panorama roof, a back window, a rear side window, or a front window of an automobile, a sunroof of heavy equipment, and so on and can be used for various purposes and are therefore industrially useful.

DETAILED DESCRIPTION OF THE PREFERRED EMBODIMENTS

The present invention will be described in detail below.
1. Fine Particles Having a Heat-Ray-Shielding Function
1) Fine particles of at least one type selected from the group consisting of lanthanum hexaboride, titanium nitride, and tungsten oxide.

Compounds in the group consisting of lanthanum hexaboride, titanium nitride, and tungsten oxide have optical characteristics showing absorption from visible light to near-infrared light, in particular, selectively absorbing near-infrared light of 780 to 1200 nm. Furthermore, the group has very strong abilities of absorbing visible light and near-infrared light with respect to an addition amount per unit area and can effectively impart a heat-ray-shielding function to a base material in a small addition amount. However, the compounds in the group are low in the ability of absorbing infrared light of 1200 nm or more and therefore have a problem that they cannot shield energy in a long-wavelength region contained in sunlight.

a) Lanthanum Hexaboride

It is preferable that the surface of lanthanum hexaboride used in the present invention be not oxidized, but usually the surface is slightly oxidized in many cases, and it is inevitable that the surface is oxidized to some extent in a process of dispersing the fine particles. However, even in such a case, the heat-ray-shielding effect is still effectively expressed.

In addition, the lanthanum hexaboride fine particles can obtain a higher heat-ray-shielding effect with the increasing degree of crystallinity, but even if the fine particles have low crystallinity to show a broad X-ray diffraction peak, they can express a heat-ray-shielding effect provided that the basic binding inside the fine particles is composed of a bond between each metal and boron.

The lanthanum hexaboride is powder colored to gray black, brown black, green black, or the like, but in the state that it is sufficiently reduced in particle size, compared to the visible light wavelength, and dispersed in a heat-ray-shielding transparent resin base material, the heat-ray-shielding transparent resin base material can be provided with visible light transmissivity. However, the infrared light-shielding ability can be maintained at a sufficiently high level. The reason thereof has not been clarified in detail yet, but it is believed that since the amount of free electrons in the fine particles is large and the absorption energy of an indirect transition between bands by free electrons in the inside and on the surfaces of the fine particles is in the vicinity of from visible to near-infrared, the heat rays in this wavelength region are selectively reflected or absorbed.

The heat-ray-shielding ability per unit weight of lanthanum hexaboride is very high, and therefore the effect can be exhibited in an amount of one-fortieth or less compared to those of ITO and ATO. Therefore, since the amount of the whole fine particles to be used can be largely reduced, problems in physical properties of the transparent resin serving as the base material, in particular, in strength, such as decreases in impact resistant strength and toughness, which are caused by blending a large amount of heat-ray-shielding particles to the heat-ray-shielding transparent resin base material, do not occur.

Since the lanthanum hexaboride exhibits absorption in the visible light region by increasing the amount used, the absorption in the visible light region can be freely controlled by controlling the addition amount of the lanthanum hexaboride, which can be applied to, for example, adjustment of brightness or protection of privacy.

Furthermore, instead of lanthanum hexaboride, other hexaborides can be also used, and typical examples thereof include cerium hexaboride ($CeB_6$), praseodymium hexaboride ($PrB_6$), neodymium hexaboride ($NdB_6$), gadolinium hexaboride ($GdB_6$), terbium hexaboride ($TbB_6$), dysprosium hexaboride ($DyB_6$), holmium hexaboride ($HoB_6$), yttrium hexaboride ($YB_6$), samarium hexaboride ($SmB_6$), europium hexaboride ($EuB_6$), erbium hexaboride ($ErB_6$), thulium hexaboride ($TmB_6$), ytterbium hexaboride ($YbB_6$), lutetium hexaboride ($LuB_6$), lanthanum cerium hexaboride ($(La,Ce)B_6$), strontium hexaboride ($SrB_6$), and calcium hexaboride ($CaB_6$).

b) Titanium Nitride

It is preferable that the surface of TiN used in the present invention be not oxidized, but usually the surface is slightly oxidized in many cases, and it is inevitable that the surface is oxidized to some extent in a process of dispersing the fine particles. However, even in such a case, the heat-ray-shielding effect is still effectively expressed. In addition, the nitride fine particles can obtain a higher heat-ray-shielding effect with the increasing degree of crystallinity, but even if the fine particles have low crystallinity to show a broad X-ray diffraction peak, they can express a heat-ray-shielding effect provided that the basic binding inside the fine particles is composed of a bond between titanium and nitrogen.

The TiN is powder colored to brown black, blue black, or the like, but in the state that it is sufficiently reduced in particle size, compared to the visible light wavelength, and dispersed in a polycarbonate resin, a film can be provided with visible light transmissivity. However, the infrared light-shielding ability can be maintained at a sufficiently high level. The reason thereof has not been clarified in detail yet, but it is believed that since the amount of free electrons in the fine particles is large and the absorption energy of an indirect transition between bands by free electrons in the inside and on the surfaces of the fine particles is in the vicinity of visible to near-infrared, the heat rays in this wavelength region are selectively reflected or absorbed.

Furthermore, instead of TiN, other nitrides can be also used, and typical examples thereof include fine particles of zirconium nitride (ZrN), hafnium nitride (HfN), vanadium nitride (VN), niobium nitride (NbN), and tantalum nitride (TaN).

c) Tungsten Oxide

The tungsten oxide used in the present invention is preferably a compound defined by a general formula: $WO_2$ or a general formula: $W_{18}O_{49}$. Since the tungsten oxide highly absorbs, in particular, light in the vicinity of 1000 nm, in many cases, the transmission color tone is a blue-ish color.

2) At least one type of fine particles selected from the group consisting of antimony-doped tin oxide, tin-doped indium oxide, and a composite tungsten oxide defined by a general formula: $M_Y WO_Z$ (0.001≤Y≤1.0, and 2.2≤Z≤3.0)

The fine particles have optical characteristics of selectively absorbing middle-infrared of 1000 nm or more. However, the fine particles are low in ability of absorbing infrared light with respect to an addition amount per unit area. Therefore, a large amount of the fine particles is necessary for effectively imparting heat-ray-shielding characteristics to a base material, and there have been problems of a decrease in the mechanical characteristics of the base material itself and an increase in material cost.

a) Antimony-Doped Tin Oxide and Tin-Doped Indium Oxide

The antimony-doped tin oxide and the tin-doped indium oxide used in the present invention are preferably surface-treated, for suppressing the photocatalytic activities specific to the metal oxides, with at least one surface treating agent selected from the group consisting of a silane coupling agent, a titanium coupling agent, an aluminum coupling agent, and a zirconium coupling agent each having an alkoxyl group and an organic functional group. These surface treating agents to be used have affinity to the surfaces of antimony-doped tin oxide fine particles and have an alkoxyl group for forming a bond and an organic functional group having affinity to a transparent thermoplastic resin. Examples of the alkoxyl group include a methoxy group, an ethoxy group, and an isopropoxyl group, but any alkoxyl group that can be hydrolyzed to form a bond with the surface of the antimony-doped tin oxide can be used without particular limitation. Examples of the organic functional group include an alkyl group, a vinyl group, a γ-(2-aminoethyl) aminopropyl group, a γ-glycidoxypropyl group, a γ-anilinopropyl group, a γ-mercaptopropyl group, and a γ-methacryloxy group, but any organic functional group that has affinity to a transparent thermoplastic resin can be used.

b) Composite Tungsten Oxide

The composite tungsten oxide used in the present invention is defined by a general formula, $M_Y WO_Z$ (0.001≤Y≤1.0, and 2.2≤Z≤3.0), and has a hexagonal crystal structure. Since the composite tungsten oxide highly absorbs light in the near-infrared region, in particular, light in the vicinity of 1000 nm, in many cases, the transmission color tone is a blue-ish color tone.

Examples of the composite tungsten oxide fine particle defined by the general formula, $M_Y WO_Z$ (0.001≤Y≤1.0, and 2.2≤Z≤3.0), and having the hexagonal crystal structure include composite tungsten oxide fine particles of which M element contains at least one selected from the group consisting of Cs, Rb, K, Tl, In, Ba, Li, Ca, Sr, Fe, Sn, Al, and Cu.

The addition amount of the addition element M is preferably 0.1 or more and 0.5 or less and more preferably around 0.33. This is because that the value logically calculated from the hexagonal crystal structure is 0.33 and that preferable optical characteristics can be obtained in an addition amount around this value. In addition, the range of the Z is preferably 2.2≤Z≤3.0. When the value of the Z is 2.45 or higher, the formation of an undesired $WO_2$ crystal phase in an infrared light-shielding material can be completely avoided, and chemical stability of the raw material can be obtained. On the other hand, when the value of the Z is 2.999 or less, a sufficient amount of free electrons are generated to give a highly efficient infrared light-shielding material. A value of 2.95 or less is further preferable as an infrared light-shielding material. Furthermore, even in Z 3.0, free electrons are supplied by the addition of the above-mentioned element M. From the viewpoint of optical characteristics, it is more preferably 2.2≤Z≤2.99 and further preferably 2.45≤Z≤2.99.

Here, typical examples of the composite tungsten oxide material include $Cs_{0.33}WO_3$, $Rb_{0.33}WO_3$, $K_{0.33}WO_3$, and $Ba_{0.33}WO_3$, but as long as the Y and the Z are in the above-mentioned ranges, useful heat-ray-shielding characteristic can be obtained.

3) Iron Oxide Fine Particle

The iron oxide fine particles can make the value of a*b*[Color tone (D65–10°)] plus and has characteristics of making the color bronze.

Accordingly, the present inventor has mixed the fine particles of the above-described two groups 1) and 2) so that the materials belonging to the two groups compensate the respective disadvantages with each other. Thus, the resulting solar-radiation-shielding material has a visible light transmittance in the range of 5% or more and 40% or less and satisfies the following Expression 1 and also has a transmission color satisfying the following Expression 2:

solar radiation transmittance/visible light transmittance<1, and        Expression 1:

−14<a*<2, and −8<b*<2.        Expression 2:

Furthermore, the materials belonging to the above-described three groups 1), 2), and 3) compensate the respective disadvantages with one another by mixing the fine particles of the three groups. In particular, the addition of the iron oxide fine particles has characteristics that make the value of a*b* plus and adjust the color tone to the bronze color side.

Consequently, the solar-radiation-shielding material can be used to a panorama roof, a back window, and a rear side window of an automobile, which has a relatively low transmittance.

The solar-radiation-shielding material is required to have a visible light transmittance of 5% or more and 40% or less. A transmittance less than 5% is too low as that of a window, which makes the visibility of the outside view significantly low and is therefore undesirable. On the other hand, when the transmittance is higher than 40%, solar-radiation heat including visible light flowing in the inside of a room becomes large, and the solar-radiation-shielding material is insufficient for shielding solar radiation, in particular, in midsummer, which makes the air-conditioning cooling load for decreasing the inside temperature high and is therefore undesirable.

In the first aspect of the invention, the transmission color of the solar-radiation-shielding material is preferably within the ranges of −14<a*<2, and −8<b*<2 in the above-mentioned visible light transmittance range. When a*≤−14, the green component is too strong, and when 2≤a*, the red component is too strong. Similarly, when b*≤−8, the blueness is too strong, and when 2≤b*, the yellowness is too strong. Therefore, in the outside of these ranges, the color deviates from a neutral to dark blue or dark green hue, which is popular among general users, and is therefore undesirable.

In the second aspect of the invention, the transmission color of the solar-radiation-shielding material is preferably within the range of $-2<a^*<14$, and $2<b^*<12$. When $a^*\le-2$, the green component is too strong, and when $14\le a^*$, the red component is too strong. Similarly, when $b^*\le2$, the blue component is too strong, and when $12\le b^*$, the yellow component is too strong. Therefore, in the outside of these ranges, the color deviates from a bronze hue, which is popular among general users, and is therefore undesirable.

The diameter of the fine particles having the heat-ray-shielding function is desirably 300 nm or less. A diameter larger than 300 nm causes scattering of light in the visible light region to make the solar-radiation-shielding material cloudy and is therefore undesirable.

Furthermore, the fine particles having the solar-radiation-shielding function are preferably surface-treated with at least one selected from the group consisting of a silane compound, a titanium compound, a zirconia compound, and an aluminum compound. The weather resistance is increased by coating the fine particle surface with the above-mentioned material. In addition, since the antimony-doped tin oxide and the tin-doped indium oxide have photocatalytic activities specific to the metal oxides, the surface treatment is preferred from the viewpoint of suppressing the activities to prevent degradation of the polycarbonate resin.

The addition amount per 1 $m^2$ of the heat-ray-shielding fine particles of the present invention desirably satisfies the Expression 5 shown below. In the Expression 5, the factor multiplied to each of the heat-ray-shielding fine particles is determined based on the visible light absorbing performance per unit weight of the heat-ray shielding fine particle. For example, when the visible light transmittance of a polycarbonate sheet having a heat-ray-shielding function is controlled to the same value, it is experimentally confirmed that the necessary addition amount of titanium oxide per 1 $m^2$ is $1/160$ of that of tin-doped indium oxide.

When the value of [(addition amount of titanium nitride $(g/m^2)\times160$)+(addition amount of lanthanum hexaboride $(g/m^2)\times40$)+(addition amount of tungsten oxide $(g/m^2)\times40$)+(composite tungsten oxide $(g/m^2)\times4$)+(antimony-doped tin oxide $(g/m^2)$)+(tin-doped indium oxide $(g/m^2)$)] is 5 or less, the visible light-absorbing performance is insufficient and is improper as a panorama roof, a back window, and a rear side window of an automobile for the purpose of protecting privacy, and also a sufficient heat-ray-shielding ability cannot be obtained. Conversely, when the value is 50 or more, the absorption of visible light is too high so that light cannot be taken in from the outside, though a sufficient heat-ray-shielding ability can be obtained.

$$5\ (g/m^2)<(\text{addition amount of titanium nitride}\ (g/m^2)\times160)+(\text{addition amount of lanthanum hexaboride}\ (g/m^2)\times40)+(\text{tungsten oxide}\ (g/m^2)\times40)+(\text{composite tungsten oxide}\ (g/m^2)\times4)+(\text{antimony-doped tin oxide}\ (g/m^2))+(\text{tin-doped indium oxide}\ (g/m^2))<50\ (g/m^2).$$

Expression 5:

In addition, the total addition amount per 1 $m^2$ of the fine particles is desirably 20 $g/m^2$ or less. When the total addition amount per 1 $m^2$ is higher than 20 $g/m^2$, the mechanical characteristics (impact resistance, surface hardness, and bending strength) of the polycarbonate resin itself may be deteriorated, though it also depends on the thickness of the polycarbonate sheet. Furthermore, the material cost is also increased.

In the optical characteristics of the solar-radiation-shielding material for vehicle windows containing the fine particles having a heat-ray-shielding function of the present invention, solar radiation transmittance/visible light transmittance<1. That is, it is desirable that the value of the solar radiation transmittance is smaller than that of the visible light transmittance. In the case of solar radiation transmittance/visible light transmittance>1, the inside of a vehicle is too dark for sufficiently reducing the solar energy entering into the inside from the outside. The solar radiation transmittance can be reduced by significantly decreasing the visible light transmittance by adding a large amount of a pigment or a dye to the polycarbonate sheet, but it has been conventionally difficult to satisfy solar radiation transmittance/visible light transmittance<1.

Furthermore, particle size of the heat-ray-shielding fine particles used in the present invention is preferred as small as possible, and the average particle size thereof is 300 nm or less, more preferably 100 nm or less, considering the infrared absorption performance and the transparency of the resin used. Here, the average particle size is determined by observing the powder of heat-ray shielding fine particles with a transmission electron microscope and calculating the average value of particle sizes of the powder.

The solar-radiation-shielding material can further contain, in addition to the fine particles having a heat-ray-shielding function of the present invention, at least one selected from the group consisting of zinc oxide fine particles, cerium oxide fine particles, and titanium oxide fine particles as an ultraviolet absorber. Considering the transparency of the resin used, the average particle size is 300 nm or less and preferably 100 nm or less. Here, the average particle size is determined by observing the powder of heat-ray shielding fine particles with a transmission electron microscope and calculating the average value of particle sizes of the powder.

In order to suppress the photocatalytic activity of the ultraviolet absorber and increase its dispersibility to a transparent thermoplastic resin, the ultraviolet absorber is preferably surface-treated with at least one surface treating agent selected from the group consisting of a silane coupling agent, a titanium coupling agent, an aluminum coupling agent, and a zirconium coupling agent. These surface treating agents to be used have affinity to the surface of the ultraviolet absorber and have an alkoxyl group for forming a bond and an organic functional group having affinity to a transparent thermoplastic resin. Examples of the alkoxyl group include a methoxy group, an ethoxy group, and an isopropoxyl group, but any alkoxyl group that can be hydrolyzed to form a bond with the surface of the inorganic ultraviolet absorber can be used without particular limitation. Examples of the organic functional group include an alkyl group, a vinyl group, a γ-(2-aminoethyl)aminopropyl group, a γ-glycidoxypropyl group, a γ-anilinopropyl group, a γ-mercaptopropyl group, and a γ-methacryloxy group, but examples are not particularly limited thereto, and any organic functional group that has affinity to a transparent thermoplastic resin can be used.

In addition, in order to increase the dispersibility to the inorganic ultraviolet absorber in the thermoplastic resin, an organic polymer dispersant can be simultaneously used with the above-mentioned coupling agent.

2. Structure of Solar-Radiation-Shielding Material for Vehicle Windows

As one configuration of the structure of the solar-radiation-shielding material for vehicle windows according to the present invention, the solar-radiation-shielding material for vehicle windows of the first or the second aspect of the invention includes the fine particles having the heat-ray-shielding function contained in a polycarbonate resin molded product.

The polycarbonate sheet containing the fine particles having the heat-ray-shielding function may have at least one surface provided with an abrasion-resistant hard coat layer. For example, an abrasion-resistant hard coat layer of silicate-based, acrylic-based, or the like can be formed on the sheet. The abrasion resistance of the molded product can be increased by forming the hard coat layer, and the polycarbonate sheet containing the fine particles having the heat-ray-shielding function can be used in a panorama roof, a back window, and a rear side window of an automobile.

The polycarbonate resin used in the present invention is preferably an aromatic polycarbonate. Examples of the aromatic polycarbonate include polymers obtained by a known method, such as interfacial polymerization, melt polymerization, or solid phase polymerization, from at least one divalent phenol-based compound represented by 2,2-bis(4-hydroxyphenyl)propane and 2,2-bis(3,5-dibromo-4-hydroxyphenyl)propane and a carbonate precursor represented by phosgene, diphenyl carbonate, and so on.

Then, any method that can uniformly disperse fine particles in a resin can be arbitrarily selected as the method for dispersing the heat-ray-shielding fine particles in the polycarbonate resin. For example, a heat-ray-shielding fine particle dispersion is prepared by dispersing the fine particles in an arbitrary solvent by a method such as bead milling, ball milling, sand milling, or ultrasonic dispersion. A mixture in which the fine particles are uniformly dispersed in the polycarbonate resin can be prepared by using a method for uniformly melt-mixing the dispersion, a powder or pellet of the polycarbonate resin, and, according to need, other additives, while removing the solvent, using a mixture such as a ribbon blender, a tumbler, a nauta mixer, a henschel mixer, a super mixer, or a planetary mixer and a kneader such as a banbury mixer, a kneader, a roll, a kneader-ruder, a uniaxial extruder, or a biaxial extruder. Alternatively, a mixture in which the fine particles are uniformly dispersed in the polycarbonate resin can be prepared by removing the solvent of the heat-ray-shielding fine particle dispersion by a known method and melt-mixing the resulting powder, a powder or pellet of the polycarbonate resin, and, according to need, other additives. Furthermore, a method in which a powder of heat-ray-shielding fine particles not being dispersion-treated and a heat resistant dispersant are directly added to the polycarbonate resin, and they are uniformly melt-mixed, can be employed. The method is not limited these methods as long as the heat-ray-shielding fine particles are uniformly dispersed in the polycarbonate resin.

Examples of the method for forming the polycarbonate sheet containing the fine particles having the heat-ray-shielding function include arbitrary methods such as injection molding, extrusion molding, compression molding, and rotational molding. In particular, a method for obtaining a molded product by injection molding is suitably employed. The injection molded product can be suitably used in a panorama roof, a back window, and a rear side window of an automobile.

The polycarbonate sheet containing the fine particles having the heat-ray-shielding fine particles can be used by itself in a panorama roof, a back window, and a rear side window of an automobile and also can be used in a constructional material as a heat-ray-shielding transparent laminate by being united to another transparent molded product such as inorganic glass, resin glass, or a resin film by an arbitrary method. For example, a transparent laminate having a heat-ray-shielding function and a heat-ray-shielding ability having a scattering-preventing function can be obtained by laminating and uniting the polycarbonate sheet containing the fine particles having the heat-ray-shielding function, which has been formed into a sheet shape in advance, to inorganic glass by a heat lamination method.

The transparent laminate having a heat-ray-shielding ability can be also obtained by forming the polycarbonate sheet containing the fine particles having the heat-ray-shielding function and, at the same time, laminating and uniting the sheet to another transparent molded product by a heat lamination method, a coextrusion method, a press molding method, an injection molding method, or the like. The transparent laminate having the heat-ray-shielding ability can be used as a further useful material for automobile windows by effectively showing advantages of the respective molded products and, at the same time, compensating the respective disadvantages with each other.

Furthermore, the polycarbonate sheet containing the fine particles having the heat-ray-shielding function according to the present invention can contain usual additives. For example, in addition to a dye or a pigment that is usually used for coloring a thermoplastic resin for providing an arbitrary color tone according to need, such as an azo-based dye, a cyanine-based dye, a quinoline-based, a perylene-based dye, and carbon black, a stabilizer such as a hindered phenol-based or phosphorous-based stabilizer, a mold release agent, an ultraviolet absorber such as a hydroxybenzophenone-based, salicylic acid-based, HALS-based, triazole-based, or triazine-based ultraviolet absorber, a coupling agent, a surfactant, an antistatic agent, and so on can be used as additives in amounts effectively exhibiting the functions.

Furthermore, as one configuration of the structure of the solar-radiation-shielding material for vehicle windows according to the present invention, it is also preferable that the fine particles having the heat-ray-shielding function of the first or the second aspect of the invention be contained in one selected from the group consisting of a polyvinyl butyral resin, a polyvinyl acetate resin, and a polyvinyl alcohol resin and be used as an intermediate film.

It is provided a solar-radiation-shielding material for vehicle windows having a laminated structure interposing the above-described solar-radiation-shielding material for vehicle windows as an intermediate film between two laminated plates, wherein the laminated plates are at least one type selected from the group consisting of an inorganic glass plate, a polycarbonate resin molded product, and a polyethylene terephthalate resin molded product.

The solar-radiation-shielding material for vehicle windows can be produced so that at least one of the two laminated plates is the solar-radiation-shielding material for vehicle windows in which the fine particles having the heat-ray-shielding function are contained in the polycarbonate resin molded product.

The above-described solar-radiation-shielding material for vehicle windows preferably has a shape with a thickness of 2.5 to 30 mm and a maximum projected area of 400 to 60000 $cm^2$.

The maximum size that can be produced by the current injection molding technology is 60000 $cm^2$, and therefore a solar-radiation-shielding material having a size larger than the above is difficult to be produced. However, it may be possible to produce a solar-radiation-shielding material with a larger size by innovation in manufacturing apparatuses and injection molding methods in future. Furthermore, a size of 400 $cm^2$ or less is too small to be applied to vehicle windows and is therefore inadequate. Similarly, the maximum thickness that can be produced by the current injection molding technology is 30 mm, and therefore a thickness larger than the above is difficult to be produced. Furthermore, when the thickness is less than 2.5 mm, there is a possibility that sufficient rigidity of a vehicle itself is not obtained when the material is mounted on the vehicle.

The solar-radiation-shielding material for vehicle windows of the present invention having the above-described many configurations can be applied to vehicle windows, in particular, a sunroof, a panorama roof, a back window, a rear side window, and a front window of an automobile, a sunroof of heavy equipment, and so on, which have required a design that gives priority to how economically it shields heat of solar rays, rather than the brightness.

EXAMPLES

Examples of the present invention will be specifically described with comparative examples below. However, the present invention is not limited to the following examples. Furthermore, note that, in each example, the dispersion particle size of each type of particle was measured with ELS-8000, manufactured by Otsuka Electronics Co., Ltd., employing a dynamic light scattering method as the principle.

The visible light transmittance and the solar radiation transmittance of a solar-radiation-shielding material for vehicle windows were measured with a spectrophotometer U-4000 manufactured by Hitachi, Ltd.

Example 1

Ten percents by weight of TiN fine particles, 10% by weight of a dispersant, and 80% by weight of toluene were weighed in a paint shaker containing $ZrO_2$ beads with a diameter of 0.3 mm and were subjected to pulverization and dispersion treatment for 6 hours to prepare a TiN fine particle dispersion (solution A). Here, the dispersed particle size of the oxidized TiN fine particles in the TiN fine particle dispersion (solution A) was measured to be 80 nm.

Furthermore, a dispersant was added to the solution A so that the weight ratio of the dispersant and the TiN fine particles was dispersant/TiN fine particles=3. The toluene was removed using a spray dryer to obtain TiN fine particle dispersion powder (hereinafter abbreviated to powder A).

Then, the resulting powder A was added to a polycarbonate resin pellet being a thermoplastic resin so that the TiN concentration was 2.0% by weight, followed by uniformly mixing with a blender. The mixture was melt-kneaded with a biaxial extruder, and the extruded strand was cut into a pellet shape to give a polycarbonate master batch containing the TiN fine particles (hereinafter abbreviated to master batch A).

Ten percents by weight of ATO fine particles, 10% by weight of a dispersant, and 80% by weight of toluene were weighed in a paint shaker containing $ZrO_2$ beads with a diameter of 0.3 mm and were subjected to pulverization and dispersion treatment for 6 hours to prepare an ATO fine particle dispersion (solution B). Here, the dispersed particle size of the oxidized ATO fine particles in the ATO fine particle dispersion (solution B) was measured to be 63 nm.

Furthermore, a dispersant was added to the solution B so that the weight ratio of the dispersant and the ATO fine particles was dispersant/ATO fine particles=3. The toluene was removed using a spray dryer to obtain ATO fine particle dispersion powder (hereinafter abbreviated to powder B).

Then, the resulting powder B was added to a polycarbonate resin pellet being a thermoplastic resin so that the ATO concentration was 2.0% by weight, followed by uniformly mixing with a blender. The mixture was melt-kneaded with a biaxial extruder, and the extruded strand was cut into a pellet shape to give a polycarbonate master batch containing the ATO fine particles (hereinafter abbreviated to master batch B).

Then, the master batch A and the master batch B were diluted with a polycarbonate resin pellet, followed by uniformly mixing with a tumbler. Then, the mixture was extrusion-molded in a thickness of 2.0 mm with T-dies. The addition amounts of the TiN and the ATO were adjusted to 0.06 $g/m^2$ and 9.6 $g/m^2$, respectively, to give a solar-radiation-shielding material 1 according to Example 1 in which the TiN fine particles and the ATO fine particles were uniformly dispersed in the entire resin. Here, the dispersed particle size of the fine particles of the solar-radiation-shielding material was 75 nm.

As shown in Table 1, the solar radiation transmittance (ST) was 19.1% when the visible light transmittance (VLT) was 31.7%.

Example 2

A solar-radiation-shielding material 2 according to Example 2 was prepared by the same process as in Example 1 except that the addition amounts of TiN and ATO were adjusted to 0.09 $g/m^2$ and 14.4 $g/m^2$, respectively. Here, the dispersed particle size of the fine particles of the solar-radiation-shielding material was 78 nm.

As shown in Table 1, the solar radiation transmittance was 15.9% when the visible light transmittance was 22.1%.

Example 3

A solar-radiation-shielding material 3 according to Example 3 was prepared by the same process as in Example 1 except that the addition amounts of TiN and ATO were adjusted to 0.11 $g/m^2$ and 1.92 $g/m^2$, respectively. Here, the dispersed particle size of the fine particles of the solar-radiation-shielding material was 73 nm.

As shown in Table 1, the solar radiation transmittance was 25.2% when the visible light transmittance was 31.9%.

Example 4

Ten percents by weight of ZnO fine particles, 10% by weight of a dispersant, and 80% by weight of toluene were weighed in a paint shaker containing $ZrO_2$ beads with a diameter of 0.3 mm and were subjected to pulverization and dispersion treatment for 3 hours to prepare a ZnO fine particle dispersion. Furthermore, a dispersant was added to the ZnO fine particle dispersion so that the weight ratio of the dispersant and the ZnO fine particles was dispersant/Zno fine particles=3. The toluene was removed using a spray dryer to obtain ZnO fine particle dispersion powder.

Then, the resulting ZnO fine particle dispersion powder was added to a polycarbonate resin pellet being a thermoplastic resin so that the concentration of the ZnO fine particle dispersion powder was 2.0% by weight, followed by uniformly mixing with a blender. The mixture was melt-kneaded with a biaxial extruder, and the extruded strand was cut into a pellet shape to give a polycarbonate master batch containing the ZnO fine particles.

Then, a solar-radiation-shielding material 4 according to Example 4 was prepared by the same process as in Example 3 except that 10% by weight of the polycarbonate master batch containing the ZnO fine particles were added. Here, the dispersed particle size of the fine particles of the solar-radiation-shielding material was 70 nm.

As shown in Table 1, the solar radiation transmittance was 24.2% when the visible light transmittance was 30.0%.

Example 5

Ten percents by weight of $WO_2$ fine particles, 10% by weight of a dispersant, and 80% by weight of toluene were weighed in a paint shaker containing $ZrO_2$ beads with a diameter of 0.3 mm and were subjected to pulverization and dispersion treatment for 6 hours to prepare a $WO_2$ fine particle dispersion (solution C). Here, the dispersed particle size of the $WO_2$ fine particles in the $WO_2$ fine particle dispersion (solution C) was measured to be 55 nm.

Furthermore, a dispersant was added to the solution C so that the weight ratio of the dispersant and the $WO_2$ fine particles was dispersant/$WO_2$ fine particles=3. The toluene was removed using a spray dryer to obtain $WO_2$ fine particle dispersion powder (hereinafter abbreviated to powder C).

Then, the resulting powder C was added to a polycarbonate resin pellet being a thermoplastic resin so that the $WO_2$ concentration was 2.0% by weight, followed by uniformly mixing with a blender. The mixture was melt-kneaded with a biaxial extruder, and the extruded strand was cut into a pellet shape to give a polycarbonate master batch containing the $WO_2$ fine particles (hereinafter abbreviated to master batch C).

Then, the master batch B and the master batch C were diluted with a polycarbonate resin pellet, followed by uniformly mixing with a tumbler. Then, the mixture was extrusion-molded in a thickness of 2.0 mm with T-dies. The addition amounts of the $WO_2$ and the ATO were adjusted to 0.44 $g/m^2$ and 1.93 $g/m^2$, respectively, to give a solar-radiation-shielding material 5 according to Example 5 in which the $WO_2$ fine particles and the ATO were uniformly dispersed in the entire resin. Here, the dispersed particle size of the fine particles of the solar-radiation-shielding material was 80 nm.

As shown in Table 1, the solar radiation transmittance was 28.7% when the visible light transmittance was 30.5%.

Example 6

Ten percents by weight of ITO fine particles, 10% by weight of a dispersant, and 80% by weight of toluene were weighed in a paint shaker containing $ZrO_2$ beads with a diameter of 0.3 mm and were subjected to pulverization and dispersion treatment for 6 hours to prepare an ITO fine particle dispersion (solution D). Here, the dispersed particle size of the ITO fine particles in the ITO fine particle dispersion (solution D) was measured to be 75 nm.

Furthermore, a dispersant was added to the solution D so that the weight ratio of the dispersant and the ITO fine particles was dispersant/ITO fine particles=3. The toluene was removed using a spray dryer to obtain ITO fine particle dispersion powder (hereinafter abbreviated to powder D).

Then, the resulting powder D was added to a polycarbonate resin pellet being a thermoplastic resin so that the ITO concentration was 2.0% by weight, followed by uniformly mixing with a blender. The mixture was melt-kneaded with a biaxial extruder, and the extruded strand was cut into a pellet shape to give a polycarbonate master batch containing the ITO fine particles (hereinafter abbreviated to master batch D).

Then, the master batch C and the master batch D were diluted with a polycarbonate resin pellet, followed by uniformly mixing with a tumbler. Then, the mixture was extrusion-molded in a thickness of 2.0 mm with T-dies. The addition amounts of the $WO_2$ and the ITO were adjusted to 0.44 $g/m^2$ and 1.95 $g/m^2$, respectively, to give a solar-radiation-shielding material 6 according to Example 6 in which the $WO_2$ fine particles and the ITO were uniformly dispersed in the entire resin. Here, the dispersed particle size of the fine particles of the solar-radiation-shielding material was 77 nm.

As shown in Table 1, the solar radiation transmittance was 23.1% when the visible light transmittance was 30.9%.

Example 7

Ten percents by weight of $LaB_6$ fine particles, 10% by weight of a dispersant, and 80% by weight of toluene were weighed in a paint shaker containing $ZrO_2$ beads with a diameter of 0.3 mm and were subjected to pulverization and dispersion treatment for 6 hours to prepare a $LaB_6$ fine particle dispersion (solution E). Here, the dispersed particle size of the $LaB_6$ fine particles in the $LaB_6$ fine particle dispersion (solution E) was measured to be 68 nm.

Furthermore, a dispersant was added to the solution E so that the weight ratio of the dispersant and the $LaB_6$ fine particles was dispersant/$LaB_6$ fine particles=3. The toluene was removed using a spray dryer to obtain ITO fine particle dispersion powder (hereinafter abbreviated to powder E).

Then, the resulting powder E was added to a polycarbonate resin pellet being a thermoplastic resin so that the $LaB_6$ concentration was 2.0% by weight, followed by uniformly mixing with a blender. The mixture was melt-kneaded with a biaxial extruder, and the extruded strand was cut into a pellet shape to give a polycarbonate master batch containing the $LaB_6$ fine particles (hereinafter abbreviated to master batch E).

Then, the master batch A, the master batch B, and the master batch E were diluted with a polycarbonate resin pellet, followed by uniformly mixing with a tumbler. Then, the mixture was extrusion-molded in a thickness of 2.0 mm with T-dies. The addition amounts of the $LaB_6$, the TiN, and the ATO were adjusted to 0.06 $g/m^2$, 0.06 $g/m^2$, and 1.94 $g/m^2$, respectively, to give a solar-radiation-shielding material 7 according to Example 7 in which the $LaB_6$ fine particles, the TiN fine particles, and the ATO fine particles were uniformly dispersed in the entire resin. Here, the dispersed particle size of the fine particles of the solar-radiation-shielding material was 85 nm.

As shown in Table 1, the solar radiation transmittance was 27.4% when the visible light transmittance was 37.8%.

Example 8

Ten percents by weight of $W_{18}O_{49}$ fine particles, 10% by weight of a dispersant, and 80% by weight of toluene were weighed in a paint shaker containing $ZrO_2$ beads with a diameter of 0.3 mm and were subjected to pulverization and dispersion treatment for 6 hours to prepare a $W_{18}O_{49}$ fine particle dispersion (solution F). Here, the dispersed particle size of the $W_{18}O_{49}$ fine particles in the $W_{18}O_{49}$ fine particle dispersion (solution F) was measured to be 69 nm.

Furthermore, a dispersant was added to the solution F so that the weight ratio of the dispersant and the $W_{18}O_{49}$ fine particles was dispersant/$W_{18}O_{49}$ fine particles=3. The toluene was removed using a spray dryer to obtain $W_{18}O_{49}$ fine particle dispersion powder (hereinafter abbreviated to powder F).

Then, the resulting powder F was added to a polycarbonate resin pellet being a thermoplastic resin so that the $W_{18}O_{49}$ concentration was 2.0% by weight, followed by uniformly mixing with a blender. The mixture was melt-kneaded with a biaxial extruder, and the extruded strand was cut into a pellet shape to give a polycarbonate master batch containing the $W_{18}O_{49}$ fine particles (hereinafter abbreviated to master batch F).

Then, the master batch B and the master batch F were diluted with a polycarbonate resin pellet, followed by uniformly mixing with a tumbler. Then, the mixture was extrusion-molded in a thickness of 2.0 mm with T-dies. The addition amounts of the $W_{18}O_{49}$ and the ATO were adjusted to 0.43 $g/m^2$ and 2.01 $g/m^2$, respectively, to give a solar-radiation-shielding material 8 according to Example 8 in which the $W_{18}O_{49}$ fine particles and the ATO were uniformly dispersed in the entire resin. Here, the dispersed particle size of the fine particles of the solar-radiation-shielding material was 61 nm.

As shown in Table 1, the solar radiation transmittance was 28.1% when the visible light transmittance was 31.8%.

Example 9

Ten percents by weight of $Cs_{0.33}WO_3$ fine particles, 10% by weight of a dispersant, and 80% by weight of toluene were weighed in a paint shaker containing $ZrO_2$ beads with a diameter of 0.3 mm and were subjected to pulverization and dispersion treatment for 6 hours to prepare a $Cs_{0.33}WO_3$ fine particle dispersion (solution G). Here, the dispersed particle size of the $Cs_{0.33}WO_3$ fine particles in the $Cs_{0.33}WO_3$ fine particle dispersion (solution G) was measured to be 77 nm.

Furthermore, a dispersant was added to the solution G so that the weight ratio of the dispersant and the $Cs_{0.33}WO_3$ fine particles was dispersant/$Cs_{0.33}WO_3$ fine particles=3. The toluene was removed using a spray dryer to obtain $Cs_{0.33}WO_3$ fine particle dispersion powder (hereinafter abbreviated to powder G).

Then, the resulting powder G was added to a polycarbonate resin pellet being a thermoplastic resin so that the $Cs_{0.33}WO_3$ concentration was 2.0% by weight, followed by uniformly mixing with a blender. The mixture was melt-kneaded with a biaxial extruder, and the extruded strand was cut into a pellet shape to give a polycarbonate master batch containing the $Cs_{0.33}WO_3$ fine particles (hereinafter abbreviated to master batch G).

Then, the master batch A and the master batch G were diluted with a polycarbonate resin pellet, followed by uniformly mixing with a tumbler. Then, the mixture was extrusion-molded in a thickness of 2.0 mm with T-dies. The addition amounts of the TiN and the $Cs_{0.33}WO_3$ were adjusted to 0.06 $g/m^2$ and 2.4 $g/m^2$, respectively, to give a solar-radiation-shielding material 9 according to Example 9 in which the TiN fine particles and the $Cs_{0.33}WO_3$ were uniformly dispersed in the entire resin. Here, the dispersed particle size of the fine particles of the solar-radiation-shielding material was 79 nm.

As shown in Table 1, the solar radiation transmittance was 15.7% when the visible light transmittance was 31.7%.

Example 10

A solar-radiation-shielding material 10 according to Example 9 was prepared by the same process as in Example 10 except that the addition amounts of TiN and $Cs_{0.33}WO_2$ were adjusted to 0.15 $g/m^2$ and 6.0 $g/m^2$, respectively. Here, the dispersed particle size of the fine particles of the solar-radiation-shielding material was 66 nm.

As shown in Table 1, the solar radiation transmittance was 7.1% when the visible light transmittance was 10.1%.

Example 11

Ten percents by weight of $Fe_2O_3$ fine particles, 10% by weight of a dispersant, and 80% by weight of toluene were weighed in a paint shaker containing $ZrO_2$ beads with a diameter of 0.3 mm and were subjected to pulverization and dispersion treatment for 6 hours to prepare a $Fe_2O_3$ fine particle dispersion (solution H). Here, the dispersed particle size of the $Fe_2O_3$ fine particles in the $Fe_2O_3$ fine particle dispersion (solution H) was measured to be 50 nm.

Furthermore, a dispersant was added to the solution H so that the weight ratio of the dispersant and the $Fe_2O_3$ fine particles was dispersant/$Fe_2O_3$ fine particles=3. The toluene was removed using a spray dryer to obtain $Fe_2O_3$ fine particle dispersion powder (hereinafter abbreviated to powder H).

Then, the resulting powder H was added to a polycarbonate resin pellet being a thermoplastic resin so that the $Fe_2O_3$ concentration was 2.0% by weight, followed by uniformly mixing with a blender. The mixture was melt-kneaded with a biaxial extruder, and the extruded strand was cut into a pellet shape to give a polycarbonate master batch containing the $Fe_2O_3$ fine particles (hereinafter abbreviated to master batch H).

Then, the master batch A, the master batch G, and the master batch H were diluted with a polycarbonate resin pellet, followed by uniformly mixing with a tumbler. Then, the mixture was extrusion-molded in a thickness of 2.0 mm with T-dies. The addition amounts of the TiN, the $Cs_{0.33}WO_2$, and the $Fe_2O_3$ were adjusted to 0.06 $g/m^2$, 2.4 $g/m^2$, and 0.6 $g/m^2$, respectively, to give a solar-radiation-shielding material 11 according to Example 11 in which the TiN fine particles, the $Cs_{0.33}WO_2$, and the $Fe_2O_3$ fine particles were uniformly dispersed in the entire resin. Here, the dispersed particle size of the $Fe_2O_3$ fine particles of the solar-radiation-shielding material was 81 nm.

As shown in Table 1, the solar radiation transmittance was 25.0% when the visible light transmittance was 26.6%.

Example 12

Three percents by weight of TiN fine particles and 97% by weight of isopropyl alcohol were weighed in a paint shaker containing $ZrO_2$ beads with a diameter of 0.3 mm and were subjected to pulverization and dispersion treatment for 6 hours. Then, methyltrimethoxysilane was added thereto, followed by mixing by stirring with a mechanical stirrer for 1 hour. Then, the isopropyl alcohol was removed using a spray dryer to give TiN fine particles surface-treated with a silane compound.

Three percents by weight of ATO fine particles and 97% by weight of isopropyl alcohol were weighed in a paint shaker containing $ZrO_2$ beads with a diameter of 0.3 mm and were subjected to pulverization and dispersion treatment for 6 hours. Then, methyltrimethoxysilane was added thereto, followed by mixing by stirring with a mechanical stirrer for 1 hour. Then, the toluene was removed using a spray dryer to give ATO fine particles surface-treated with a silane compound.

A solar-radiation-shielding material 12 according to Example 12 was prepared as in Example 1 except that the TiN fine particles surface-treated with a silane compound and the ATO fine particles surface-treated with a silane compound were used.

The dispersed particle size of the fine particles of the solar-radiation-shielding material was 83 nm.

As shown in Table 1, the solar radiation transmittance was 19.2% when the visible light transmittance was 31.5%.

Example 13

An abrasion-resistant hard coat solution was prepared by mixing 50% by weight of Aronix M-400 manufactured by Toa Gosei, 5% by weight of Irgacure 651 manufactured by Ciba Specialty, and 45% by weight of toluene. The abrasion-resistant hard coat solution was applied to the surface of the solar-radiation-shielding material 1 produced by the same process as in Example using a bar coater #20, followed by drying at 70° C. for 1 minute and then irradiation with UV light of 140 mW/cm$^2$ using a high-pressure mercury lamp. Thus, an abrasion-resistant hard coat layer was formed to give a solar-radiation-shielding material 13.

As shown Table 1, the solar radiation transmittance was 18.9% when the visible light transmittance 31.2%.

The pencil hardness was measured to confirm that the pencil hardness of the solar-radiation-shielding material 13 was increased to 2H by forming the abrasion-resistant hard coat layer. The pencil hardness of the solar-radiation-shielding material 1 produced in Example 1 was F.

Thus, the abrasion resistance of a solar-radiation-shielding material can be increased by forming an abrasion-resistant hard coat layer on the surface of the solar-radiation-shielding material, and the solar-radiation-shielding material can be used to, for example, windows of vehicles and automobiles.

Example 14

The TiN fine particle dispersion (solution A) and 50% by weight of a plasticizer, triethylene glycol-di-2-ethyl butyrate, were weighed, followed by removal of toluene with an agitating vacuum dryer to produce a TiN plasticizer dispersion (plasticizer solution A).

Similarly, the ATO fine particle dispersion (solution B) and 50% by weight of the plasticizer, triethylene glycol-di-2-ethyl butyrate, were weighed, followed by removal of toluene with an agitating vacuum dryer to produce an ATO plasticizer dispersion (plasticizer solution B).

The plasticizer solution A and the plasticizer solution B were added to a polyvinyl butyral resin, followed by addition of triethylene glycol-di-2-ethyl butyrate as a plasticizer. The resulting mixture was kneaded with a roll and formed into a sheet-like shape having a thickness of 0.5 mm. The addition amounts of the TiN and the ATO were adjusted to 0.06 g/m$^2$ and 9.60 g/m$^2$, respectively, to give an intermediate film (intermediate film A) in which the TiN fine particles and the ATO were uniformly dispersed in the entire resin.

Then, the intermediate film A was interposed between two float glass plates each having a thickness of 2 mm, and they were heated and pressure bonded according to a usual method for producing laminated glass to obtain a solar-radiation-shielding material 14. The dispersed particle size of the fine particles of the solar-radiation-shielding material was 69 nm.

Furthermore, as shown in Table 1, the solar radiation transmittance was 19.0% when the visible light transmittance was 30.8%.

Example 15

A solar-radiation-shielding material 15 according to Example 15 was prepared by the same process as in Example 13 except that the addition amounts of the TiN and the ATO were 0.09 g/m$^2$ and 14.4 g/m$^2$, respectively. Furthermore, the dispersed particle size of the fine particles of the solar-radiation-shielding material was 78 nm.

As shown in Table 1, the solar radiation transmittance was 15.7% when the visible light transmittance was 21.1%.

Example 16

A solar-radiation-shielding material 16 according to Example 16 was prepared by the same process as in Example 1 except that the addition amounts of the TiN and the ATO were 0.11 g/m$^2$ and 1.92 g/m$^2$, respectively. Furthermore, the dispersed particle size of the fine particles of the solar-radiation-shielding material was 73 nm.

As shown in Table 1, the solar radiation transmittance was 25.0% when the visible light transmittance was 30.9%.

Example 17

The WO$_2$ fine particle dispersion (solution C) and 50% by weight of a plasticizer, triethylene glycol-di-2-ethyl butyrate, were weighed, followed by removal of toluene with an agitating vacuum dryer to produce a WO$_2$ plasticizer dispersion (plasticizer solution C).

The plasticizer solution A and the plasticizer solution C were added to a polyvinyl butyral resin, followed by addition of triethylene glycol-di-2-ethyl butyrate as a plasticizer. The resulting mixture was kneaded with a roll and formed into a sheet-like shape having a thickness of 0.5 mm. The addition amounts of the WO$_2$ and the ATO were adjusted to 0.44 g/m$^2$ and 1.93 g/m$^2$, respectively, to give an intermediate film (intermediate film D) in which the WO$_2$ fine particles and the ATO were uniformly dispersed in the entire resin.

Then, the intermediate film D was interposed between two float glass plates each having a thickness of 2 mm, and they were heated and pressure bonded according to a usual method for producing laminated glass to obtain a solar-radiation-shielding material 17. The dispersed particle size of the fine particles of the solar-radiation-shielding material was 77 nm.

As shown in Table 1, the solar radiation transmittance was 28.4% when the visible light transmittance was 30.5%.

Example 18

The ITO fine particle dispersion (solution D) and 50% by weight of a plasticizer, triethylene glycol-di-2-ethyl butyrate, were weighed, followed by removal of toluene with an agitating vacuum dryer to produce an ITO plasticizer dispersion (plasticizer solution D).

The plasticizer solution C and the plasticizer solution D were added to a polyvinyl butyral resin, followed by addition of triethylene glycol-di-2-ethyl butyrate as a plasticizer. The resulting mixture was kneaded with a roll and formed into a sheet-like shape having a thickness of 0.5 mm. The addition amounts of the WO$_2$ and the ITO were adjusted to 0.44 g/m$^2$ and 1.95 g/m$^2$, respectively, to give an intermediate film (intermediate film E) in which the WO$_2$ fine particles and the ITO were uniformly dispersed in the entire resin.

Then, the intermediate film E was interposed between two float glass plates each having a thickness of 2 mm, and they were heated and pressure bonded according to a usual method for producing laminated glass to obtain a solarradiation-shielding material 18. The dispersed particle size of the fine particles of the solar-radiation-shielding material was 81 nm.

As shown in Table 1, the solar radiation transmittance was 22.4% when the visible light transmittance was 30.1%.

Example 19

The $LaB_6$ fine particle dispersion (solution E) and 50% by weight of a plasticizer, triethylene glycol-di-2-ethyl butyrate, were weighed, followed by removal of toluene with an agitating vacuum dryer to produce a $LaB_6$ plasticizer dispersion (plasticizer solution E).

The plasticizer solution A, the plasticizer solution B, and the plasticizer solution E were added to a polyvinyl butyral resin, followed by addition of triethylene glycol-di-2-ethyl butyrate as a plasticizer. The resulting mixture was kneaded with a roll and formed into a sheet-like shape having a thickness of 0.5 mm. The addition amounts of the $LaB_6$, the TiN, and the ATO were adjusted to 0.06 $g/m^2$, 0.06 $g/m^2$, and 1.94 $g/m^2$, respectively, to give an intermediate film (intermediate film F) in which the $LaB_6$ fine particles, the TiN fine particles, and the ATO were uniformly dispersed in the entire resin.

Then, the intermediate film F was interposed between two float glass plates each having a thickness of 2 mm, and they were heated and pressure bonded according to a usual method for producing laminated glass to obtain a solar-radiation-shielding material 19. The dispersed particle size of the fine particles of the solar-radiation-shielding material was 79 nm.

As shown in Table 1, the solar radiation transmittance was 27.3% when the visible light transmittance was 37.5%.

Example 20

The $W_{18}O_{49}$ fine particle dispersion (solution F) and 50% by weight of a plasticizer, triethylene glycol-di-2-ethyl butyrate, were weighed, followed by removal of toluene with an agitating vacuum dryer to produce a $W_{18}O_{49}$ plasticizer dispersion (plasticizer solution F).

The plasticizer solution B and the plasticizer solution F were added to a polyvinyl butyral resin, followed by addition of triethylene glycol-di-2-ethyl butyrate as a plasticizer. The resulting mixture was kneaded with a roll and formed into a sheet-like shape having a thickness of 0.5 mm. The addition amounts of the $W_{18}O_{49}$ and the ATO were adjusted to 0.43 $g/m^2$ and 2.01 $g/m^2$, respectively, to give an intermediate film (intermediate film G) in which the $W_{18}O_{49}$ fine particles and the ATO fine particles were uniformly dispersed in the entire resin.

Then, the intermediate film G was interposed between two float glass plates each having a thickness of 2 mm, and they were heated and pressure bonded according to a usual method for producing laminated glass to obtain a solar-radiation-shielding material 20. The dispersed particle size of the fine particles of the solar-radiation-shielding material was 79 nm.

As shown in Table 1, the solar radiation transmittance was 29.1% when the visible light transmittance was 31.4%.

Example 21

The $Cs_{0.33}WO_3$ fine particle dispersion (solution G) and 50% by weight of a plasticizer, triethylene glycol-di-2-ethyl butyrate, were weighed, followed by removal of toluene with an agitating vacuum dryer to produce a $Cs_{0.33}WO_3$ plasticizer dispersion (plasticizer solution G).

The plasticizer solution A and the plasticizer solution G were added to a polyvinyl butyral resin, followed by addition of triethylene glycol-di-2-ethyl butyrate as a plasticizer. The resulting mixture was kneaded with a roll and formed into a sheet-like shape having a thickness of 0.5 mm. The addition amounts of the TiN and the $Cs_{0.33}WO_3$ were adjusted to 0.06 $g/m^2$ and 2.4 $g/m^2$, respectively, to give an intermediate film (intermediate film H) in which the TiN fine particles and the $Cs_{0.33}WO_3$ fine particles were uniformly dispersed in the entire resin.

Then, the intermediate film H was interposed between two float glass plates each having a thickness of 2 mm, and they were heated and pressure bonded according to a usual method for producing laminated glass to obtain a solar-radiation-shielding material 21. The dispersed particle size of the fine particles of the solar-radiation-shielding material was 75 nm.

As shown in Table 1, the solar radiation transmittance was 15.6% when the visible light transmittance was 31.3%.

Example 22

A solar-radiation-shielding material 22 according to Example 22 was prepared by the same process as in Example 20 except that the addition amounts of the TiN and the $Cs_{0.33}WO_3$ were 0.15 $g/m^2$ and 6.00 $g/m^2$, respectively. Furthermore, the dispersed particle size of the fine particles of the solar-radiation-shielding material was 72 nm.

As shown in Table 1, the solar radiation transmittance was 7.0% when the visible light transmittance was 10.1%.

Example 23

The $Fe_2O_3$ fine particle dispersion (solution H) and 50% by weight of a plasticizer, triethylene glycol-di-2-ethyl butyrate, were weighed, followed by removal of toluene with an agitating vacuum dryer to produce a $Fe_2O_3$ plasticizer dispersion (plasticizer solution H).

The plasticizer solution A, the plasticizer solution G, and the plasticizer solution H were added to a polyvinyl butyral resin, followed by addition of triethylene glycol-di-2-ethyl butyrate as a plasticizer. The resulting mixture was kneaded with a roll and formed into a sheet-like shape having a thickness of 0.5 mm. The addition amounts of the TiN, the $Cs_{0.33}WO_3$, and the $Fe_2O_3$ were adjusted to 0.06 $g/m^2$, 2.4 $g/m^2$, and 0.6 $g/m^2$, respectively, to give an intermediate film (intermediate film J) in which the TiN fine particles, the $Cs_{0.33}WO_3$ fine particles, and the $Fe_2O_3$ were uniformly dispersed in the entire resin.

Then, the intermediate film J was interposed between two float glass plates each having a thickness of 2 mm, and they were heated and pressure bonded according to a usual method for producing laminated glass to obtain a solar-radiation-shielding material 23. The dispersed particle size of the fine particles of the solar-radiation-shielding material was 67 nm.

As shown in Table 1, the solar radiation transmittance was 24.8% when the visible light transmittance was 26.5%.

Example 24

The intermediate film H was interposed between a float glass plate having a thickness of 2 mm and the solar-radiation-shielding material 6, and they were heated and pressure bonded according to a usual method for producing laminated glass to obtain a solar-radiation-shielding material 24.

As shown in Table 1, the solar radiation transmittance was 11.6% when the visible light transmittance was 17.9%.

Example 25

The intermediate film H was interposed between a float glass plate having a thickness of 2 mm and a polyethylene terephthalate film, and they were heated and pressure bonded according to a usual method for producing laminated glass to obtain a solar-radiation-shielding material 25.

As shown in Table 1, the solar radiation transmittance was 16.2% when the visible light transmittance was 31.9%.

Comparative Example 1

The master batch B and a blue-coloring dye (anthraquinone-based blue dye (trade name: Polysynthren Blue RLS, manufactured by Clariant)) were diluted with a polycarbonate resin pellet, followed by uniformly mixing with a tumbler. Then, the mixture was extrusion-molded in a thickness of 2.0 mm with T-dies. The addition amount of the ATO was adjusted to 1.96 g/m² to give a solar-radiation-shielding material 26 according to Comparative Example 1 in which the ATO fine particles were uniformly dispersed in the entire resin and the blue-based dye was contained. Here, the dispersed particle size of the ATO fine particles of the solar-radiation-shielding material was 84 nm.

As shown in Table 1, the solar radiation transmittance was 39.6% when the visible light transmittance was 31.7%.

The ratio of solar radiation transmittance/visible light transmittance was 1.25, and the requirement, solar radiation transmittance/visible light transmittance<1, could not be satisfied.

The visible light transmittance could be reduced by using the ATO and the blue-based dye, but the solar radiation transmittance could not be sufficiently reduced. Therefore, the effect for suppressing the increase in inside temperature is low, and the use to vehicle windows is improper.

Comparative Example 2

The master batch A and the master batch D were diluted with a polycarbonate resin pellet, followed by uniformly mixing with a tumbler. Then, the mixture was extrusion-molded in a thickness of 2.0 mm with T-dies. The addition amounts of the TiN and the ITO were adjusted to 0.016 g/m² and 2.40 g/m², respectively, to give a solar-radiation-shielding material 27 according to Comparative Example 2 in which the TiN fine particles and the ITO fine particles were uniformly dispersed in the entire resin. Here, the dispersed particle size of the fine particles of the solar-radiation-shielding material was 69 nm.

As shown in Table 1, the solar radiation transmittance was 40.5% when the visible light transmittance was 65.2%.

The value of 0.016 g/m² (addition amount of TiN)×160+ 2.4 g/m² (addition amount of ITO) was 4.96, and the addition amounts of the heat-ray shielding fine particles did not satisfy the following Expression 5 shown in context. Thus, the visible light transmittance could not be sufficiently reduced, and, therefore, the use to vehicle windows for protecting privacy is improper.

$$5 \text{ (g/m}^2) < \text{(addition amount of titanium nitride (g/m}^2)) \times 160 + \text{(addition amount of lanthanum hexaboride (g/m}^2)) \times 40 + \text{(tungsten oxide (g/m}^2)) \times 40 + \text{(composite tungsten oxide (g/m}^2)) \times 4 + \text{(antimony-doped tin oxide (g/m}^2)) + \text{(tin-doped indium oxide (g/m}^2)) < 50 \text{ (g/m}^2).$$

Expression 5:

Comparative Example 3

The master batch A and the master batch B were diluted with a polycarbonate resin pellet, followed by uniformly mixing with a tumbler. Then, the mixture was extrusion-molded in a thickness of 2.0 mm with T-dies. The addition amounts of the TiN and the ATO were adjusted to 0.19 g/m² and 19.9 g/m², respectively, to give a solar-radiation-shielding material 28 according to Comparative Example 3 in which the TiN fine particles and the ATO fine particles were uniformly dispersed in the entire resin. Here, the dispersed particle size of the fine particles of the solar-radiation-shielding material was 76 nm.

As shown in Table 1, the solar radiation transmittance was 3.3% when the visible light transmittance was 3.4%.

The value of 0.19 g/m² (addition amount of TiN)×160+2.4 g/m² (addition amount of ATO) was 50.3, and the addition amounts of the heat-ray shielding fine particles did not satisfy the Expression 5 shown in context. Thus, the visible light transmittance was too low, and, therefore, the use to vehicle windows is improper.

The total addition amount per 1 m² of the heat-ray-shielding fine particles was 20.1 g/m², which was higher than the level of 20 g/m² or less shown in context. Thus, the solar-radiation-shielding material had a significantly low surface hardness and was readily damaged by being scratched with nail, and, therefore, the use to vehicle windows is improper. In addition, the material cost is also increased.

Comparative Example 4

The master batch C was diluted with a polycarbonate resin pellet, followed by uniformly mixing with a tumbler. Then, the mixture was extrusion-molded in a thickness of 2.0 mm with T-dies. The addition amount of the $WO_2$ was adjusted to 0.44 g/m² to give a solar-radiation-shielding material 29 according to Comparative Example 4 in which the $WO_2$ fine particles were uniformly dispersed in the entire resin. Here, the dispersed particle size of the fine particles of the solar-radiation-shielding material was 76 nm.

As shown in Table 1, the solar radiation transmittance was 45.7% when the visible light transmittance was 35.9%.

The ratio of solar radiation transmittance/visible light transmittance was 1.27, and the requirement, solar radiation transmittance/visible light transmittance<1, could not be satisfied. Since $WO_2$ was used alone, the absorption of infrared of 1000 nm or more was insufficient, and the solar radiation transmittance could not be sufficiently reduced. Therefore, the effect for suppressing the increase in inside temperature is low, and the use to vehicle windows is improper.

TABLE 1

| | Heat-ray-shielding material addition amount (g/m²) | | | | | | | | Total amount of fillers (g/m²) | Optical characteristics | | | Color tone (D65-10°) | |
|---|---|---|---|---|---|---|---|---|---|---|---|---|---|---|
| | LaB₆ | TiN | WO₂ | W₁₈O₄₉ | Cs₀.₃₃WO₂ | ATO | ITO | Fe₂O₃ | | VLT (%) | ST (%) | ST/VLT | a* | b* |
| Example 1 | | 0.060 | | | | 9.600 | | | 9.66 | 31.7 | 19.1 | 0.60 | −4.68 | 1.37 |
| Example 2 | | 0.090 | | | | 14.400 | | | 14.49 | 22.1 | 15.9 | 0.72 | −6.22 | 1.43 |
| Example 3 | | 0.110 | | | | 1.920 | | | 2.03 | 31.9 | 25.2 | 0.79 | −3.56 | −5.04 |
| Example 4 | | 0.110 | | | | 1.920 | | | 2.03 | 30.0 | 24.2 | 0.80 | −3.40 | −4.88 |
| Example 5 | | | 0.440 | | | 1.930 | | | 2.37 | 30.5 | 28.7 | 0.94 | −2.67 | −6.10 |
| Example 6 | | | 0.440 | | | | 1.950 | | 2.39 | 30.9 | 23.1 | 0.74 | −2.78 | −6.20 |
| Example 7 | 0.060 | 0.060 | | | | 1.940 | | | 2.06 | 37.8 | 27.4 | 0.72 | −5.10 | 1.89 |
| Example 8 | | | | 0.430 | | 2.010 | | | 2.44 | 31.8 | 28.1 | 0.88 | −2.67 | −5.12 |
| Example 9 | | 0.060 | | | 2.400 | | | | 2.46 | 31.7 | 15.7 | 0.49 | −10.20 | −6.30 |
| Example 10 | | 0.150 | | | 6.000 | | | | 6.15 | 10.1 | 7.1 | 0.70 | −13.90 | −7.90 |
| Example 11 | | 0.060 | | | 2.400 | | | 0.600 | 3.06 | 26.6 | 25.0 | 0.93 | 4.35 | 3.78 |
| Example 12 | | 0.060 | | | | 9.600 | | | 9.66 | 31.5 | 19.2 | 0.61 | −4.72 | 1.31 |
| Example 13 | | 0.060 | | | | 9.600 | | | 9.66 | 31.2 | 18.9 | 0.61 | −4.55 | 1.32 |
| Example 14 | | 0.060 | | | | 9.600 | | | 9.66 | 30.8 | 19.0 | 0.62 | −5.18 | 0.87 |
| Example 15 | | 0.090 | | | | 14.400 | | | 14.49 | 21.1 | 15.7 | 0.74 | −6.71 | 0.98 |
| Example 16 | | 0.110 | | | | 1.920 | | | 2.03 | 30.9 | 25.0 | 0.81 | −4.01 | −5.52 |
| Example 17 | | | 0.440 | | | 1.930 | | | 2.37 | 30.5 | 28.4 | 0.93 | −3.16 | −6.57 |
| Example 18 | | | 0.440 | | | | 1.950 | | 2.39 | 30.1 | 22.4 | 0.74 | −3.21 | −6.63 |
| Example 19 | 0.060 | 0.060 | | | | 1.940 | | | 2.06 | 37.5 | 27.3 | 0.73 | −5.55 | 1.89 |
| Example 20 | | | | 0.430 | | 2.010 | | | 2.44 | 31.4 | 29.1 | 0.93 | −3.00 | −5.12 |
| Example 21 | | 0.060 | | | 2.400 | | | | 2.46 | 31.3 | 15.6 | 0.50 | −10.88 | −6.30 |
| Example 22 | | 0.150 | | | 6.000 | | | | 6.15 | 10.1 | 7.0 | 0.70 | −13.99 | −7.98 |
| Example 23 | | 0.060 | | | 2.400 | | | 0.600 | 3.06 | 26.5 | 24.8 | 0.93 | 3.96 | 3.23 |
| Example 24 | 0.060 | 0.120 | | | 2.400 | 1.940 | | | 4.52 | 17.9 | 11.6 | 0.65 | −8.45 | −2.95 |
| Example 25 | | 0.060 | | | 2.400 | | | | 2.46 | 31.9 | 16.2 | 0.51 | −9.98 | −6.02 |
| Comparative Example 1 | | | | | | 1.960 | | | 1.96 | 31.7 | 39.6 | 1.25 | −3.05 | −5.21 |
| Comparative Example 2 | | 0.016 | | | | | 2.400 | | 2.42 | 65.2 | 40.5 | 0.62 | −1.35 | −0.35 |
| Comparative Example 3 | | 0.190 | | | 19.900 | | | | 20.10 | 3.4 | 3.3 | 0.97 | −13.82 | −7.90 |
| Comparative Example 4 | | | 0.440 | | | | | | 0.44 | 35.9 | 45.7 | 1.27 | −3.80 | −8.92 |

What is claimed is:

1. solar-radiation-shielding material for vehicle windows, the solar-radiation-shielding material comprising
a polycarbonate resin that includes fine particles having a heat-ray-shielding function, the fine particles consisting of a mixture of
a surface oxidized titanium nitride that includes a surface modified with methylsilane [MeSi(O-)₃];
a composite tungsten oxide defined by a general formula: Ca$_y$WO$_z$ (0.001 ≤Y≤1.0, and 2.2≤Z≤3.0); and
Fe₂O₃;
the solar-radiation-shielding material having a visible light transmittance in the range of 5% to 40%; having a ratio of solar radiation transmittance to visible light transmittance of less than 1; having a transmission color within the range of −2<a*<14, and 2<b*<12; and having an addition amount of the fine particles per 1 m² that includes 5(g/m²)<(addition amount of the surface oxidized titanium nitride (g/m²)×160) +(composite tungsten oxide (g/m²)×4))<50(g/m²).

2. The solar-radiation-shielding material of claim 1, wherein the solar-radiation-shielding material consists of the fine particles and a mixture of the polycarbonate resin and a resin selected from the group consisting of a polyvinyl butyral resin, a polyvinyl acetate resin, and/or a polyvinyl alcohol resin, and a mixture thereof.

* * * * *